(12) United States Patent
Grime et al.

(10) Patent No.: US 6,420,309 B1
(45) Date of Patent: Jul. 16, 2002

(54) METHOD OF TRANSFER MELT PRINTING OF METAL SUBSTRATES, AND THE DECORATIVE SURFACE COATED ITEMS PREPARED THEREBY

(75) Inventors: Paul Grime; Joseph Rudisi, both of Virginia Beach; William Yannetti, Chesapeake; David Kearney, Newport News, all of VA (US)

(73) Assignee: Mitsubishi Chemical America, Inc., Chesapeake, VA (US)

( * ) Notice: Subject to any disclaimer, the term of this patent is extended or adjusted under 35 U.S.C. 154(b) by 0 days.

(21) Appl. No.: 09/475,038

(22) Filed: Dec. 30, 1999

(51) Int. Cl.⁷ .................... B41M 5/035; B41M 5/38
(52) U.S. Cl. ................ 503/227; 428/913; 428/914
(58) Field of Search .............. 8/471; 428/913, 428/914; 503/227

(56) References Cited

U.S. PATENT DOCUMENTS

| | | | |
|---|---|---|---|
| 5,268,347 A | * 12/1993 | Okumura et al. | 503/227 |
| 5,395,719 A | * 3/1995 | Jousewaard et al. | 430/14 |
| 5,856,267 A | 1/1999 | Sherman et al. | 503/227 |
| 5,985,416 A | 11/1999 | Sherman et al. | 503/227 |
| 5,994,264 A | 11/1999 | Sherman et al. | 503/227 |

OTHER PUBLICATIONS

Alpolic ISD, "Throwing Nature a Curve", 1999, Mitsubishi Chemical America, Inc.

* cited by examiner

*Primary Examiner*—Bruce H. Hess
(74) *Attorney, Agent, or Firm*—Oblon, Spivak, McClelland, Maier & Neustadt, P.C.

(57) ABSTRACT

A melt transferred imaged coated product and process for decorative simulated wood, metal or stone-like patterns especially useful on treated non-sealed, non-anodized metal-resin composites for interior signage and display, is described. The product exhibits excellent adhesion bonding between the aluminum surface and the transferred-carrier film that contains the dry-ink image that is deposited on the aluminum surface. The aluminum surface is prepared by conventional pre-etching means, coated with a suitable thermosetting resin and then optionally primed with an adhesive prior to melt transfer of the image. The final surface finish coating is protected with an additional transparent adhesive backed polymer film.

34 Claims, 4 Drawing Sheets

METHOD OF TRANSFER MELT PRINTING OF METAL SUBSTRATES, AND THE DECORATIVE SURFACE COATED ITEMS PREPARED THEREBY

BACKGROUND OF THE INVENTION

1. Field of the Invention

The present invention relates to a method for enhancing the surface characteristics of metal surfaces, particularly metal coil composites and the decorative surfaces produced thereby.

2. Discussion of the Background

Various composite laminates are known wherein a metal sheet is laminated with a thermoplastic synthetic resin sheet. U.S. Pat. No. 4,508,425 discloses a mirror-like surface manufactured by plating chromium on one surface of a metal sheet bonded to a composite sheet, made up of a synthetic resin sheet and the metal sheet, to form the mirror surface. The mirrored finish sheet may be worked to a desired shape and may be formed with a decorative pattern.

U.S. Pat. No. 4,560,623 discloses a specular product of bronze-like tone particularly suitable for use as a decorative material. The specular product uses, as a substrate, a composite board comprising a synthetic resin sheet and metal sheets laminated thereon, and includes a nickel deposit plated on the metal sheet and a specular film of Sn—Ni alloy electroplated on the nickel deposit using a specific electroplating bath.

Such composites are useful for a number of architectural applications, because the composites combine light weight with high strength. These composites may be used as finished surfaces for all or some portion of the interior or exterior surfaces of a building. However, the range of surface characteristics and patterns available in these patents is somewhat limited. Metal-resin composite laminates that mimic different wood grain, stone, and metallic surfaces for decorative or substitutive purposes are desired, but not readily available. The metal-resin composite laminates must also exhibit good weathering resistance with regard to temperature and humidity changes experienced during shipping and storage and capable of bending to a sharp angle without cracking of the coating on the exposed exterior surface of the metal. The composite must be capable of being cut to specified lengths, curved, routed, sawn, filed, drilled and fastened in order to complete fabrication of the desired item with the appropriate finish.

Thus, there remains a need for coated metal sheets that mimic different wood grain, stone and metallic surfaces, which exhibit excellent resistance to cracking, stress crazing, delamination, impact, and the like during fabrication of the item that requires the decorative surface. There also remains a need for proper methods to prepare such metal sheets and resultant composite laminates.

It has been known for sometime how to prepare colored articles from non-sealed anodized aluminum alloys in a form such as foil, sheet and containers by a thermal printing method as described in U.S. Pat. No. 4,177,299, incorporated herein by reference. More generally, methods have been described for decorative surface coatings of flat substrates using transfer sheets that are pressed on the substrate at elevated temperatures as included in U.S. Pat. No. 5,019,198. The pressing of the transfer sheet against the substrate is carried out with a press tool devoid of surface pattern and having a generally flat press surface.

Transfer printing such as sublimation printing transfers dyes or inks into the clear coating on the metal by pressing transfer paper against the clear coated surface under heat and pressure is well known. Transfer printing of inks or dyes into a variety of articles such as shirts, mugs, plastic articles and plastic coated substrates is also well known in the art. Dispersible dye crystals or inks are printed in reverse images in transfer paper or film that is to be used to transfer print the article to be decorated. The article to be decorated is usually made of plastic or has a plastic or polymer coating on it into which the dyes are transferred.

Most transfer printing is referred to as sublimation printing in which the dyes are said to sublimate under heat and pressure to be driven into any receptive substrate that is put in contact with the transfer paper. Such sublimation printing was developed circa 1969 and has been used extensively to print many articles including plastic coated metal substrates. Transfer printing also includes a melt printing process that is as described in several patents and patent applications including U.S. Pat. Nos. 4,587,155; 4,670,084; 4,668,239 and Published application WO 92/21514. According to U.S. Pat. No. 4,587,155, the desired dye image is transferred from the paper to the substrate by heating the dye to a temperature above its melting point but below its vaporization temperature so the dye will diffuse into the softened plastic substrate. Published Application WO 92/21,514 describes melt printing of planar metal base members such as aluminum, steel or the like which have been coated on at least one planar surface with a melt printable layer of softenable, dye-permeable thermoplastic or thermoset material such as polyethylene terephthalate, polybutylene terephthalate or other thermoplastic polyesters, polycarbonates, nylons and the like. Application WO 92/21,514 further describes bilayer coatings of thermoplastic or thermoset materials including a base coat optimally provided with a pigment and a second layer that can comprise a clear resin.

Canadian Patent 1,108,929 describes a process for applying designs to unscaled, anodized aluminum which is continuously heated to a temperature at which colored components of ink will sublime. The heated strip is fed into contact with an ink-carrying web so the ink is heated and transferred into the anodized aluminum surface. The decorated aluminum strip is then cooled with water and passed through a sealing bath filled with a sealing solution such as buffered aqueous nickel.

U.S. Pat. No. 5,643,659 details an intricate and elaborate heat transfer printing method for producing images having metallic luster, which would be visually similar to some examples of the present invention. This method describes a heat transfer printing sheet that produces the image by successively providing a transparent color layer with a coloring agent and hot-melt binder, and a metallic ink layer with metallic ink and hot-melt binder.

U.S. Pat. No. 4,352,721 describes a process for continuously printing an unsealed anodized aluminum strip by transfer from a carrier web of a design in printing ink containing colored sublimable components. This process includes feeding the aluminum strip to a heated moving surface allowing the carrier web to come in contact with the aluminum strip so that the printing ink is heated by contact with the anodized aluminum surface. In this manner the colored components of the ink transfer by sublimation from the carrier web to the aluminum strip. Sealing of the printed strip can then be accomplished either immediately after the printing of the unsealed surface or the printed strip may be coiled after cooling and subsequently sealed.

For a number of years, the coil coatings and industrial coatings industries have successfully coated unsealed, nonanodized and anodized metal substrates which have been anodized or etched by an electrochemical process employing sulfuric acid, chromic acid, phosphoric acid, or oxalic acid electrolytes. Such unsealed, non-anodized or anodized metal substrates provide an excellent base for adhesion of a paint, enamel or lacquer coating because of the surface porosity of the non-anodized or anodized metal surfaces.

Coating compositions for coating metal coils are often subjected to elevated temperatures during warehousing and shipping and especially during storage at coil coating plants where temperatures of about 120° to 140° F. (49° to 60° C.) may be encountered. These elevated temperature conditions can lead to delamination of laminated decorative coated compositions or cracking and peeling of painted surfaces for said compositions.

Transfer printing of metal substrates has heretofore frequently resulted in inconsistent and uneven transfer (mottling and/or ghosting) of the transferred images. Solid color areas have been difficult to produce in acceptable quality due to mottling. Ghosting is a faint offset second image that makes the product unacceptable. A process is therefore needed for producing a sharp and consistent image in a variety of mass-produced products including the aluminum composite building materials of the present invention.

Additionally, sealing of the anodized metal substrate can substantially reduce the abrasion resistance thereof. When anodized metal substrates have been sealed, it is very difficult for paint or a coating to adhere to the surface of the sealed, anodized metal substrate.

Furthermore, in producing unsealed, anodized metal parts, it has been necessary to first fabricate the desired part, then anodize the metal substrate. This extra step is time consuming and costly. A method is needed that eliminates the need for anodizing. It has not been previously possible to successfully improve the surface appearance of such metal substrates in coil form and thereafter fabricate satisfactory parts from the coated metal coil substrate.

Additionally metal substrate in coil form with the decorative finish must not become blocked, i.e. it is important that the coated coil is able to slide and unroll without sticking and binding.

SUMMARY OF THE INVENTION

Accordingly, one object of the present invention is to provide an improved process for transfer printing one or both sides of a metal substrate.

Another object of the present invention is to provide a transfer printed metal article, sheet or composite having one or more decorative surfaces having improved clarity and uniformity of print quality.

A further object of the present invention is to provide a decorative coating composition and process for a metal substrate or composite surface whereby the resulting product has sufficient integrity and adhesion to the metal surface, particularly coiled metal substrates.

A further object of the present invention is to provide a decorative coating for metal substrates or composites that allows post-coating fabrication of the coated metal into suitable parts of elements, particularly parts of elements for use with interior signage and displays, kiosks, building panels, etc.

Another object of the present invention is to provide a decorative coating that exhibits sufficient stability and integrity to permit the coated metal substrates to resist corrosion, hazing, cloudiness, flaking, cracking, mottling and/or delamination of the decorative coating when exposed to environmental factors such as smog, ultraviolet light, ozone, and excessive heat and cold, and abrasive cleaning solutions.

Another object of the present invention is to provide a decorative coating composition and process for an aluminum substrate or composite surface that avoids the need for anodizing.

It is another object of the present invention to provide a method for preparing a decoratively coated metal plate or composite, which may be bent to a sharp angle without cracking of the coating.

These and other objects and advantages of the present invention have been satisfied by the discovery of a method for transfer printing of a metal article by coating a surface of the metal article with an adhesive primer followed by a layer of a polymer thermoset resin, curing the thermoset resin, then applying a printed dye image to the resulting layer of cured polymer thermoset resin by use of a transfer film comprising a carrier film having a reverse printed dye image coated on one side of the carrier film, by applying pressure and heat to the transfer film, then removing the carrier film, leaving the printed dye image imprinted on the cured polymer thermoset resin, and the resulting coated metal articles obtained thereby.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

The present invention relates to transfer printing onto a metal article or metal-resin sheet composite and in particular to a method and apparatus for transfer printing an image onto the coated metal surface(s).

In its simplest embodiment, the present invention relates to a coated metal article comprising (a) a metal substrate; (b) an adhesive primer on a surface of the metal substrate; and (c) a printed dye image bearing layer coated over the adhesive primer, wherein the printed dye image bearing layer comprises a cured polymer thermoset resin having a printed dye image applied thereto. In a further embodiment, the printed dye image bearing layer can further comprise a layer of a thermally cured adhesive between the cured polymer thermoset resin and the printed dye image (i.e., the printed dye image is on the adhesive layer rather than the cured polymer thermoset resin layer). In a particularly preferred embodiment the coated metal article comprises a protective layer applied over the printed dye image, which is removed prior to installation and/or use of the coated metal article.

In a most preferred embodiment of the present invention, the metal substrate is a metal-resin composite laminate having a resin core sheet and at least one metal sheet outer layer, prior to coating.

The metal article may be formed of any of various metals such as aluminum, iron, copper, tin, steel, and the like. Aluminum and iron are preferred, and aluminum is particularly preferred. The metal article can take any desired shape, so long as it is possible to apply the transfer film in a uniform manner to the surface to be transfer printed. Preferred forms for the metal article are metal sheets and metal-resin sheet composite laminates. Although there is no particular constraint on the thickness of the metal sheet, if the coated metal sheet is to be used as a component in a composite laminate, it is preferred that the sheet have a thickness of 0.01 to 2 mm, most preferably 0.1 to 0.8 mm.

The decorative metal sheets or composites of the present invention include interior signage and display ("ISD") finishes. The finishes are accomplished by the use of a transfer printing technique that requires heat and pressure to transfer the desired pattern from a prefabricated patterned thermoplastic film onto the metal surface of the plate or composite.

The pattern must be adhered sufficiently to the metal article or composite to permit post-pattern forming, molding, bending or shaping of the metal into suitable parts, especially for use as components of composite building or construction panels, without the pattern delaminating or flaking from the metal surface. The surface patterns are also resistant to hazing, clouding, flaking, and delamination under conditions of use where the coated metal is exposed to the harmful effects of ultraviolet light and other environmental factors such as heat, humidity, ozone, smog, etc. For exterior applications, an additional UV protective layer, such as a polyvinylidene diflouride (PVDF) coating, can be applied, if desired. The invention also relates to a process for coating the metal surface of the initially and finally coiled composites in order to obtain a proper surface for the transfer process to be successfully completed. Once the transfer process is properly achieved, the resultant composite can be used for interior or exterior decorative purposes. The decorative coatings on the article or composite surface (s) are preferably intended to simulate wood, metal, stone or marbleized grain patterns appealing to various potential customer applications. Both standard and custom designs are possible based on the need and availability of the patterned carrier film. The invention also relates to the coated metal plates prepared by such a process and composites comprising such coated metal plates.

The present invention provides a system for transfer printing decorative or informative images onto metal substrates. The method of the present invention comprises coating a surface of a metal article with an adhesive primer. A polymer thermoset resin layer is then applied over the adhesive primer and cured. The desired transfer image is then preferably applied to the cured polymer thermoset resin layer by use of a transfer film comprising a carrier film having coated on a surface thereof a reverse printed dye image. The side of the transfer film having the reverse printed dye image is applied directly to the cured polymer thermoset resin layer and pressure and heat are applied to cause the printed dye image to migrate onto and partially into the surface of the cured polymer thermoset resin layer. In a further embodiment, the cured polymer thermoset layer may further contain a layer of thermally cured adhesive on the surface to be transfer printed. In that embodiment, the printed dye image is actually transferred to the surface of the thermally cured adhesive layer. Depending on the characteristics desired, the cured polymer thermoset resin can contain other conventional additives and excipients such as pigments. Any suitable pigment may be used, with one purpose of the pigment being to provide an opaque character to the thermoset resin layer, thus blocking the metal surface from sight. However, in certain embodiments, it could be desirable to permit the metal surface to show through to provide unique optical effects in the transferred pattern, such as a marbleized metallic appearance. In such cases, the polymer thermoset resin layer should be pigment free.

As a final step of a preferred embodiment of the present process, a protective film can be applied to the printed dye image bearing surface of the metal article. The protective film can be prepared from any film forming substance having sufficient adhesion to the printed image bearing surface to protect the surface during shipping and/or installation, but be readily removed with minimal force applied and without leaving a residue on the printed image bearing surface. The protective film is preferably a thermoplastic film, more preferably a film such as QUALITY COTE® produced by Main Tape of Union, N.J. The protective film can be adhered to the surface of the product using a light-duty adhesive or by static adhesion or as a shrink wrapped coating over the entire surface and/or the entire article. The protective film can have any level of opacity desired, from transparent to opaque. The protective film can also be colored if desired, for example for color coding of warehouse stock. Most preferably, the protective film is transparent and colorless to provide the customer/ contractor to readily identify the printed image on the metal article even with the protective film present.

In accordance with this method, coated metal articles, sheets or metal-resin composites are transfer printed by melt printing. The method of the present invention can be performed on an individual article in a batchwise manner, on a continuous series of articles in an automated manner or on a continuous article such as a coil of metal sheeting or coil of metal-resin composite sheeting. A preferred method uses a continuous rolling system with an unwinder spool for the initially coiled thermosetting polyester (preferably Valspar) coated aluminum-resin plate composite followed by a preheater, that is most preferably a stationary convection oven, through which the aluminum-resin plate composite is transferred during unwinding. The first pass allows for transfer of an adhesive primer deposited on the surface of the polyester coated aluminum via a transfer film that is adhered after preheating of the polyester coated aluminum-resin panel to approximately 125° F. using a series of heated rollers normally heated above 370° F. The adhesive primer and subsequent transfer film (second pass) are fed directly through a roll-on laminator or hot stamping machine (after the pre-heating step) using an appropriate stamping pressure, preferably up to 300 lb/sq in. The aluminum resin-composite is fed through a series of (optionally heated) rollers that simultaneously feed the polyester coated aluminum composite and the transfer film toward a final take-up spool. During this portion of the operation, the preferred method is for the dye image portion of the transfer film to be deposited on the surface of the Valspar treated aluminum and the remaining, transparent, relatively dye-less carrier film allowed to recoil onto a take-up spool. Transfer of the desired decorative image is normally accomplished at a take-up speed of 1–3 meters/minute. The carrier film is also a thermoplastic, preferably a polyester or heat resistant polyolefin that is taken-up at a speed relative to the image transfer process. Preferably, the carrier film should be cooled to below 75° F. prior to removal of the carrier film. Upon completion of the decorative surface onto the metal-resin composite, the composite is subsequently protected with a clear, adhesive backed thermoplastic film using the same or similar process as described above for image transfer. The carrier film portion of the transfer film can provide a dual function as the protective film, then be removed just prior to use. This requires, however, that the carrier film must be able to be removed in the absence of heat without damaging the transferred printed dye image.

Temperature and pressures are controlled as needed to ensure adhesion levels are sufficient between the primed Valspar treated aluminum surface and the transferred image. Preferably, the temperature is about 374° F. and the pressure is about 300 lb/sq in. The resultant either single-sided or dual-sided decoratively coated aluminum composite can then be subsequently again unspooled and respooled in order to add an adhesive backed protective film to the decoratively coated surfaces, for shipping and handling purposes. This film is normally discarded by the fabricator before using the decorative aluminum composite building material for its intended purposes.

In a specific preferred embodiment, the coiled aluminum plate composite is treated with a primer (such as PMW0632) on one or optionally both pre-etched aluminum surfaces with a polyester coating or paint, preferably Valspar PMW 1494 over either an 0.010"–0.020" aluminum alloy 5052 (hardness H32) skin that contains a sandwiched polyethylene composite. A transfer carrier film of a specified hardness and mar resistance (SR, SOSR, or HSR) is comprised on the top side, of a suitable thermoplastic that has received one or multiple colored dyes that yield the desired decorative finish. These dyes within the carrier film are activated when heated and/or pressurized and mobilize to become transferred to the polyester coated aluminum substrate. The bottom side of the transfer carrier film includes a thermally activated adhesive that is specially formulated to be compatible with the polyester coating. Additionally, the polyester coated aluminum surface can be primed by the use of a "base film" that contains the same or similar adhesive and is applied just prior to the transfer carrier film to prime the surface with the adhesive. The need for priming the Valspar coated aluminum surface is based on existing thermal and pressure conditions and the level of adhesion, mar resistance, crazing, and crack resistance desired for the final decorative surface finish.

In a further preferred embodiment of the present process, the metal sheet, in particular aluminum sheet, is uncoiled and first coated with a primer (such as PMW 0632 obtainable from Valspar Corp.) with a dried film thickness of 0.0004–0.0006" and then a layer of Valspar PMW 1494 (obtainable from Valspar Corp.), with a dried film thickness of 0.0095–0.001" that is subsequently heat cured to ensure proper crosslinking and thermoset properties. A next step in the process includes priming with adhesive by use of an adhesive backed carrier film onto one or more of the surfaces. If the metal sheet is to be used in a laminate with a resin core, then the surface of the metal sheet to be bonded to the resin core is preferably coated with a layer of thermosetting polyester and primed with this adhesive. Good results have been achieved using a pigmented thermosetting polyester paint marketed by Valspar Corp., under the trade name of Valspar PMW 1494. Next, the melt curable transfer-carrier film is applied after the metal-resin composite has been pre-heat treated, by feeding the composite panel (in the uncoiled state) through a series of heated rollers to an uptake spool. Simultaneously, the carrier film, void of any pigment is respooled and eventually recycled or disposed.

Finally, the newly finished melt transferred imaged metal-resin composite in coil form is again unspooled and respooled so that a protective transparent polymer coating can be applied. Alternatively, as indicated above, the carrier film can double as the protective film, so long as the carrier film can be removed from the printed surface without marring the printed image appearance.

The resin core of the composites may be composed of any resin suitable for use in metal resin laminate plates. Such resins are described in U.S. Pat. No. 4,994,130, which is incorporated herein by reference. It includes, for example, polyethylene, polypropylene, polybutane, polyvinyl chloride, polystyrene, polyamide, polyethylene terephthalate, polybutylene terephthalate and polycarbonate. From the viewpoint of the extrusion molding properties, it is preferred to employ a polyolefin synthetic resin such as polyethylene, polypropylene, or polybutene. As such a thermoplastic resin, not only a virgin material, but also a recovered material or reproduced material may be used in the form of a sheet. To such a thermoplastic resin, a foaming agent, a flame retardant, a filler, a coloring agent, etc. may be incorporated as the case requires. Good results have been achieved by using a low density polyethylene core.

It is particularly preferred that the metal sheet(s) be laminated with the resin core by means of an adhesive laminating film, disposed between the resin core and the metal sheet. Most preferably, the adhesive film is a modified polyolefin resin such as those described in U.S. Pat. No. 4,762,882, which is incorporated herein by reference.

Suitably, the resin core is 1 to 10 mm thick, preferably 2 to 5 mm thick. The adhesive film is suitably 10 to 100 $\mu$m thick, preferably 15 to 50 $\mu$m thick. The laminate of the present invention may be prepared by extruding the resin core through a die to form a flat sheet and passing the extruded resin sheet through laminating rollers simultaneously with two metal sheets, one on each surface of the resin sheet. At least one and sometimes both of the metal sheets are coated according to the present invention. The metal sheets according to the present invention are oriented such that the Valspar coated layers face away from the resin core.

The metal sheets and metal-resin composites can be any desired width. Preferably, from a building/construction standpoint, the sheets and composites are 4 ft or 8 ft in width to allow them to be ultimately cut into sizes of 4'×8', although any size can be prepared.

Typically, the resin core is laminated at a temperature of 110° to 190° F., preferably 125° to 165° F. It is preferred to extrude the resin sheet to a thickness which is larger than the gap between the laminating rollers by about 10%. Preferably, the coated metal sheet is preheated to a temperature of 320° to 420° F., most preferably 330° to 400° F. before passing through the laminating rollers with the resin core. The lamination is suitably carried out at a temperature of 320° to 410° F. Suitably, the laminating pressure is 250 to 1100 psi, preferably 400 to 1000 psi. In a preferred embodiment, the coated metal plate is laminated to the resin core by an adhesive film. In this case, a multilayered arrangement, in which the adhesive film is disposed between the metal sheet and the resin core, is forced through the laminating rollers. In the preferred embodiment, the finished decorative surface of the final laminate is covered with a protective film to prevent marring of the surface during stacking and shipping.

Figure 1A:
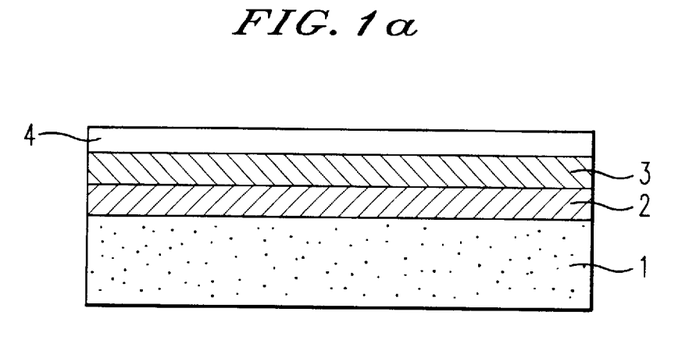
FIG. 1 provides a cross-sectional side view of the finished decorative surface coated metal-resin composite of the present invention.
Figure 1B:
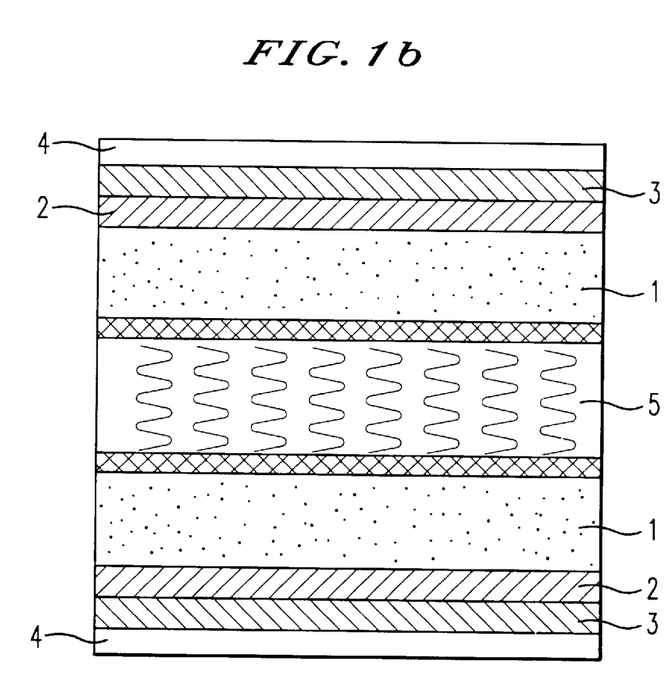

Referring now to the drawings, wherein like reference numerals designate identical or corresponding parts throughout the several views; FIG. 1a shows a cross-sectional view of a coated metal article of the present invention, particularly in the form of a metal sheet. The metal substrate (1) is coated with an adhesive primer (2) followed by a cured layer of polymer thermoset resin (3), followed by the melt transferred image (4) to produce a decorative finish suitable for indoor panels that simulate wood grain, stone-like, or metal-like surfaces. FIG. 1b shows a cross-sectional view of a coated metal-resin composite laminate according to the present invention. Therein core (5) is sandwiched between two coated metal sheets according to the present invention each of which comprise a metal substrate (1), an adhesive primer layer (2), a cured polymer thermoset resin layer (3) and a melt transferred image layer (4). It is noted that the melt transferred image layer is shown as a separate and distinct layer from the thermoset resin, but may intermingle or interpenetrate the thermoset resin layer (or the additional adhesive layer in a further embodiment). The coated metal sheets are oriented such that the melt transferred image layers (4) face away from the resin core (5). Although the embodiment shown has two coated metal sheets of the present invention, it is to be understood that other embodiments will employ only one of the present coated metal sheets.

Figure 2:
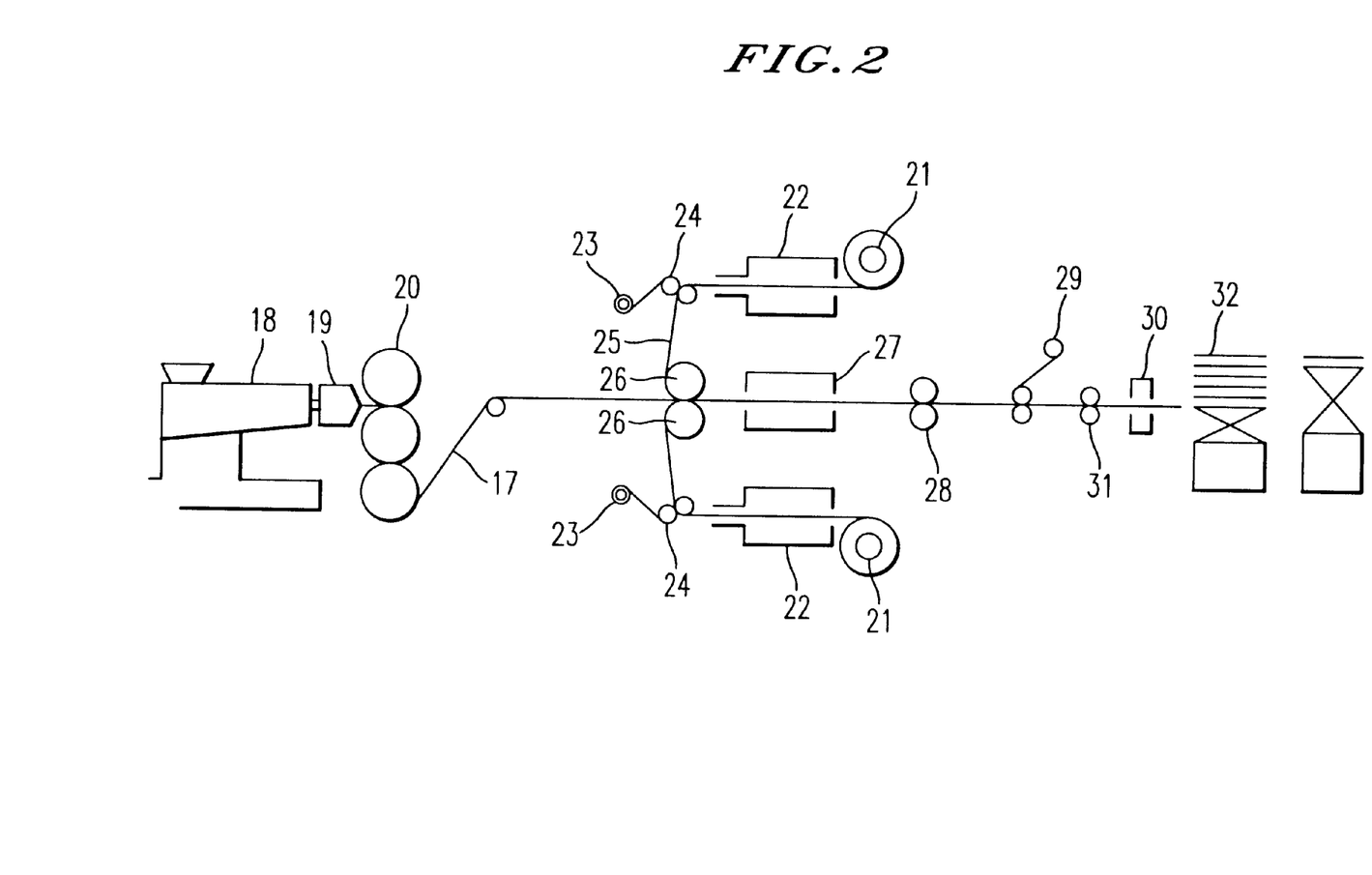
FIG. 2 illustrates an apparatus for forming the coated metal plates and coils of the present invention.

FIG. 2 schematically illustrates an apparatus used for preparing the present metal-resin composite laminates. The structure and operation of the apparatus will be discussed in terms of forming a laminate in which the resin core is sandwiched between two coated metal sheets of the present invention. However, it is to be understood that either one of the present coated metal sheets may be omitted or replaced with any suitable replacement such as an uncoated metal sheet. The resin core (17) is extruded through an extruder (18) through a T-die (19) and passed through a sheeting three roll set (20). The coated metal sheet is uncoiled from an uncoiler (21) and preheated in a preheater (22). The adhesive film (23) and the preheated coated metal sheet are passed through prelaminating rollers (24) to give a metal sheet-adhesive film composite (25) and the extruded resin core (17) that are then passed through the laminating rolls (26) and on through the cooler (27), by means of pulling rollers (28). An optional, protective film (29) may be applied downstream of the pulling rollers (28).

The shears (29) downstream of the pulling rollers (28) are for cutting the laminate to desired length and are preferably flying shears. The laminate may be cut to width by means of the slitter (or trimmer) (30). The finished product is collected on a plier (32).

Figure 3:
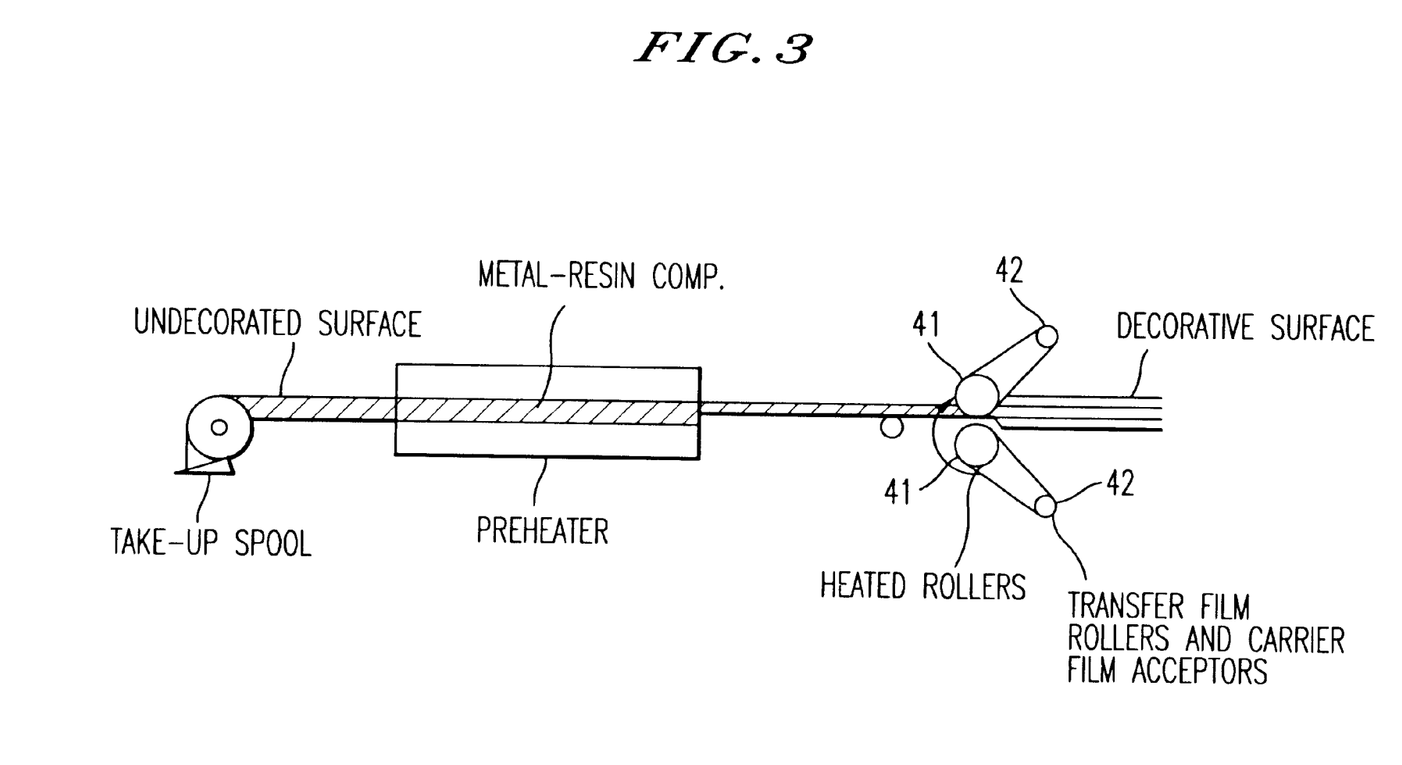
FIG. 3 provides a schematic of the process line used to provide the decorative surface coated metal-resin composite laminate of the present invention.

FIG. 3 illustrates a typical process set-up for production of the ISD panel of the present invention. Panels of aluminum composite (4'×8') are stocked in proximity to the manufacturing operation. In this set-up, a decorative laminate as described above, is applied to only one side. Initially, the aluminum composite is preheated to 125° F. by use of a convection oven arrangement using infrared heat for preheat treatment.

Next, after the aluminum composite is preheated, it is drawn through the heated rollers (41) and the decorative pattern is transferred from the carrier film to the surface of the aluminum composite. The carrier film is then wound onto separate winding rollers (42) where it may be discarded or recycled. During this process, temperature and pressure (174° F. and 300 lb/sq in) are applied to enable the transfer to occur rapidly and ensure proper adhesion uniformly across the aluminum composite surface. The completed ISD panel is then taken up on a final take-up spool (not shown). The speed at which this process occurs is normally 1–3 m/min, however, it is possible to operate at other speeds, both slower and faster. Faster speeds would result in higher throughput and reduced manufacturing costs.

A variety of different decorative finishes can be applied to the metal-resin composite substrate of the present invention. These finishes are all available from Kurz-Hastings Company of Philadelphia, Pa. Suitable decorative finishes are available under the following product numbers:

Black Canyon Marble—WJB66063HSR
Tasmanian Oak—ZKS57193T4SR
Cherry Hill Cherry—KEM67260SR
Burl—KRM56321SR
Sedona Pine—XWCS6768HSR
Sierra Walnut—HQY57090RH
Red Oak—WK67220SR
Snowbird Oak—WXM59785SR
Cracked Cherry—JYB59900SR
Merit Oak—XDM66072SR
Bleached Oak—WXM59379SR
Velvet Cherry—WK58993SR
Matte Gold—M86363HSR
Matte Silver—M86882HSR This list is by no means exhaustive of the type of finishes available or useable in the present invention and is merely an illustrative listing of the various finish types.

Figure 4:
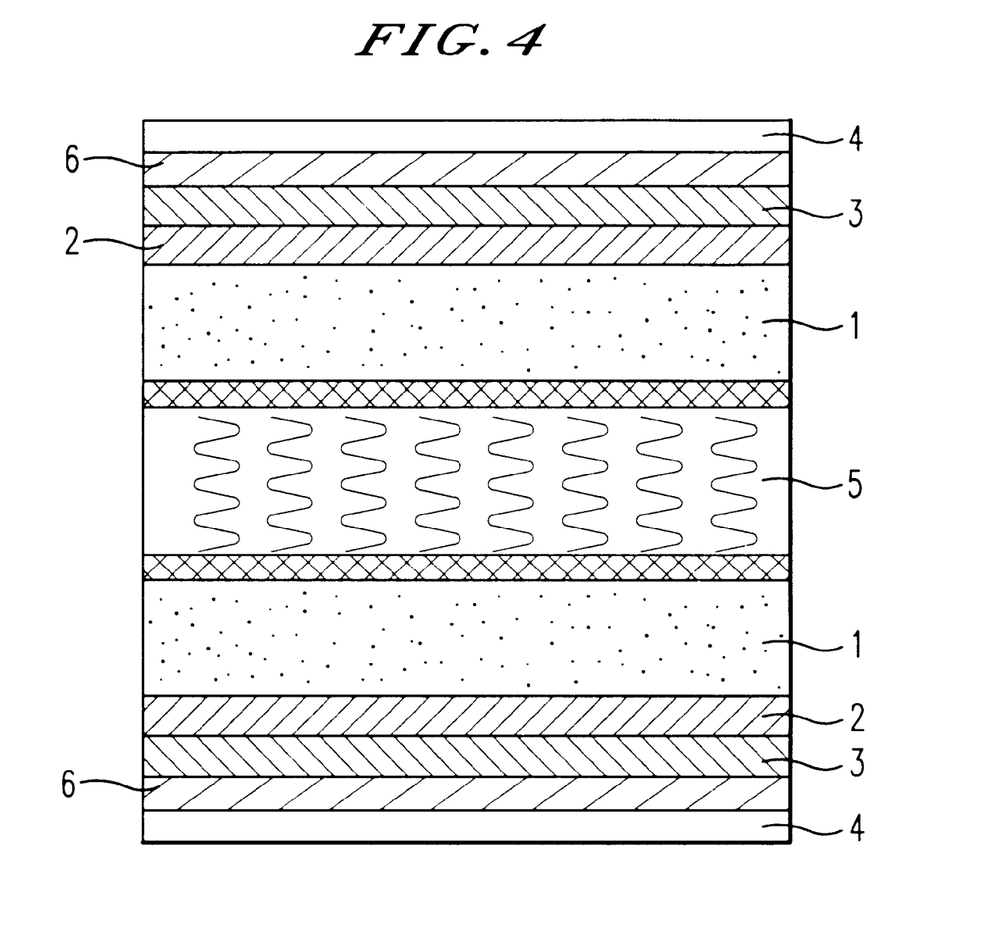
FIG. 4 provides a further embodiment of the metal-resin composite structure of the present invention.

FIG. 4 shows an embodiment of the metal-resin composite of the present invention having two metal sheets (1) around core (5). On the metal sheets (1) are the adhesive primer (2) and the two polymer thermoset layers (3). The melt transferred image layers (4) are applied with the assistance of an additional layer of adhesive primer (6). Again, even though the melt transferred image layer (4), adhesive primer layer (6) and polymer thermoset layer (3) are shown as distinct layers in the figure, this is merely for clarity and convenience and the layers can be intermingled or interpenetrating.

As noted above, the coated metal sheets and metal-resin composite laminates of the present invention possess a number of desirable characteristics. The present metal sheets and laminates may be bent to angles as sharp as 90° without cracking the coatings. The metal sheets may be bent as is, and the composites may be bent after scoring or cutting the metal sheet along the line of bending on the acute side of the bend. Also, because the exterior surface of both the present metal sheets and composites is a cured transferred image, it is possible to achieve surfaces having acceptable decorative wood, metal or stone grain surface appearance.

In applying the melt transfer printing images of this invention to untreated, unsealed, nonanodized metal, and particularly aluminum alloy 5052 H32, substrates in coil form, it has been discovered that the Valspar PMW 1494 and appropriate adhesive binder together with appropriate transfer-carrier films supplied by Kurz-Hastings of Philadelphia Pa. produces decorative surface coatings with outstanding adhesive properties, as described above and in FIG. 3.

The melt transferred imaged coatings on unsealed, nonanodized metal coil substrates obtained according to this invention are characterized by excellent properties. Such coil coated metal substrates and corresponding surfaces are stable and exhibit essentially no hazing, clouding, flaking or delamination.

The coated coils slide and unroll easily and are substantially devoid of any problem with blocking or sticking. Such coated coil substrates are also characterized by excellent adhesion characteristics such that the coated metal coil substrates can be formed into desired parts of elements without delamination or cracking of the coated metal substrates. In fact, coated coil substrates have been subjected to 2T (two thicknesses) bending (three 180° bends) without showing evidence of cracking or delamination of the high gloss coating when immersed in room temperature copper sulfate solution. Mar resistance of such coated coil substrates is excellent as is impact resistance of the coatings when subjected to an impact at 40 lbs/in$^2$ (28.124×10$^3$ kgs/m$^2$).

EXAMPLES

Abrasion was tested with a Taber abrader with CS-10 wheels and 1000 g load. Different thicknesses of the polyester coated aluminum substrate were tested and wore differently. SOSR coatings at 2–4 mm wore at 300 cycles, SR/SOSR 2 mm wore at 450 cycles, 3 mm at 500 cycles, and 4 mm at 575 cycles. Within the context of the present description, the term "wore" indicates the number of cycles of the Taber abrader required to go through the decorative coating to the metal. Scratch resistance was evaluated using the BYK #5810 pencil hardness spring loaded gauge. All SR/SOSR test panels passed 1000 gm-load conditions. SOSR test panels passed 500 gm-load conditions. Humidity resistance was evaluated at 40 C. and 98% RH for 120 hours and this was reported to have no effect on the test panels.

Cross hatch adhesion was evaluated using #610 and #232 tape. For the 4mm SR/SOSR coating using the #610 tape, a trace of coating was removed. All other samples experienced no loss of coating. All test panels using the #232 tape had no coating removed. Temperature cycling resistance was evaluated at 66 C. for 1 hour –20 C. for 1 hour and 1 hour at room temperature. A total of 12 such cycles were performed. The SOSR coated panel exhibited a trace amount of coating removed by the tape test. The SR/SOSR samples also had slight coating removed by tape testing. Strain resistance was evaluated per ASTM D1308 using the spot method covered by a watch glass for 24 hours. The 2, 3, and 4 mm SOSR test panels were slightly strained by the use of ethyl alcohol. There was no strain seen for the SR/SOSR test panels.

With the foregoing description of the invention, those skilled in the art will appreciate that modifications may be made to the invention without departing from the spirit thereof. Therefore. it is not intended that the scope of the invention be limited to the specific embodiments illustrated and described.

What is claimed is:

1. A coated metal article comprising:
   (a) a metal substrate;
   (b) an adhesive primer on a surface of said metal substrate;
   (c) a printed dye image bearing layer coated over said adhesive primer, wherein said printed dye image bearing layer comprises a cured polymer thermoset resin having a printed dye image applied thereto; and
   (d) a layer of a thermally cured adhesive between said cured polymer thermoset resin and said printed dye image.

2. The coated metal article of claim 1, further comprising a layer of a protective film over said printed dye image bearing layer.

3. The coated metal article of claim 2, wherein said protective film is a protective thermoplastic film.

4. The coated metal article of claim 3, wherein the layer of protective thermoplastic film is adhered to said printed dye image bearing layer by a layer of light-duty adhesive or by static adhesion.

5. The coated metal article of claim 4, wherein said light duty adhesive has sufficient adhesion to adhere the protective thermoplastic film to the printed dye image bearing layer, but will allow removal of the protective thermoplastic film with no residue of the light-duty adhesive remaining on the printed dye image bearing layer.

6. The coated metal article of claim 2, wherein the protective film is transparent and colorless.

7. A coated metal-resin composite comprising:
   (a) a resin sheet; and
   (b) a pair of coated metal sheets laminated on a first and second surface of said resin sheet; wherein said coated metal sheets comprise;
   (c) a metal substrate with an interior and exterior surface;
   (d) an adhesive primer on said exterior surface of the metal substrate;
   (e) a printed dye image bearing layer coated over said adhesive primer, wherein said printed dye image bearing layer comprises a cured polymer thermoset resin having a printed dye image thereon; and
   (f) a layer of a thermally cured adhesive between said cured polymer thermoset resin and said printed dye image.

8. The coated metal-resin composite of claim 7, further comprising a layer of a protective film over said printed dye image bearing layer.

9. The coated metal-resin composite of claim 8, wherein said protective film is a protective thermoplastic film.

10. The coated metal-resin composite of claim 9, wherein the layer of protective thermoplastic film is adhered to said printed dye image bearing layer by a layer of light-duty adhesive or by static adhesion.

11. The coated metal-resin composite of claim 10, wherein said light duty adhesive has sufficient adhesion to adhere the protective thermoplastic film to the printed dye image bearing layer, but will allow removal of the protective thermoplastic film with no residue of the light-duty adhesive remaining on the printed dye image bearing layer.

12. The coated metal-resin composite of claim 9, wherein the protective thermoplastic film is transparent.

13. The coated metal-resin composite of claim 7, wherein said metal substrate is selected from the group consisting of aluminum, iron, copper, tin, and steel.

14. The coated metal-resin composite of claim 7, wherein said metal substrate is aluminum.

15. The coated metal-resin composite of claim 7, wherein said metal substrate has a thickness of 0.001 to 0.003 inches.

16. The coated metal-resin composite of claim 7, wherein said resin sheet has a thickness of 1 to 10 mm.

17. The coated metal-resin composite of claim 7, wherein said printed dye image bearing layer of cured polymer thermoset resin has a thickness of 1$\mu$.

18. The coated metal-resin composite of claim 7, wherein the coated metal-resin composite has a total coating thickness of 1 to 40 $\mu$m.

19. The coated metal-resin composite of claim 7, wherein said resin sheet comprises a resin selected from the group consisting of polyethylene, polypropylene, polybutene, polyvinyl chloride, polystyrene, polyamide, polyethylene terephthalate, polybutylene terephthalate, and polycarbonate.

20. The coated metal-resin composite of claim 19, wherein said resin sheet comprises polyethylene, said polyethylene containing carbon black in the range of 1–3 wt %.

21. A coated metal-resin composite comprising:
(a) a resin sheet; and
(b) at least one coated metal sheet laminated on a surface of said resin sheet; wherein said coated metal sheet comprises;
(c) a metal substrate with an interior and exterior surface;
(d) an adhesive primer on said exterior surface of the metal substrate;
(e) a printed dye image bearing layer coated over said adhesive primer, wherein said printed dye image bearing layer comprises a cured polymer thermoset resin having a printed dye image thereon; and
(f) a layer of a thermally cured adhesive between said cured polymer thermoset resin and said printed dye image.

22. The coated metal-resin composite of claim 21, further comprising a layer of a protective film over said printed dye image bearing layer.

23. The coated metal-resin composite of claim 22, wherein said protective film is a protective thermoplastic film.

24. The coated metal-resin composite of claim 23, wherein the layer of protective thermoplastic film is adhered to said printed dye image bearing layer by a layer of light-duty adhesive or by static adhesion.

25. The coated metal-resin composite of claim 24, wherein said light duty adhesive has sufficient adhesion to adhere the protective thermoplastic film to the printed dye image bearing layer, but will allow removal of the protective thermoplastic film with no residue of the light-duty adhesive remaining on the printed dye image bearing layer.

26. The coated metal-resin composite of claim 23, wherein the protective thermoplastic film is transparent.

27. The coated metal-resin composite of claim 21, wherein said metal substrate is selected from the group consisting of aluminum, iron, copper, tin, and steel.

28. The coated metal-resin composite of claim 21, wherein said metal substrate is aluminum.

29. The coated metal-resin composite of claim 21, wherein said metal substrate has a thickness of 0.001 to 0.003 inches.

30. The coated metal-resin composite of claim 21, wherein said resin sheet has a thickness of 1 to 10 mm.

31. The coated metal-resin composite of claim 21, wherein said printed dye image bearing layer of cured polymer thermoset resin has a thickness of $1\mu$.

32. The coated metal-resin composite of claim 21, wherein the coated metal-resin composite has a total coating thickness of 1 to 40 $\mu$m.

33. The coated metal-resin composite of claim 21, wherein said resin sheet comprises a resin selected from the group consisting of polyethylene, polypropylene, polybutene, polyvinyl chloride, polystyrene, polyamide, polyethylene terephthalate, polybutylene terephthalate, and polycarbonate.

34. The coated metal-resin composite of claim 33, wherein said resin sheet comprises polyethylene, said polyethylene containing carbon black in the range of 1–3 wt %.

* * * * *